Feb. 22, 1938. G. R. BROWN 2,108,959
VALVE
Filed Aug. 1, 1936

INVENTOR
GEORGE R. BROWN
BY Brockett, Hyde, Higley & Meyer
ATTORNEYS

Patented Feb. 22, 1938

2,108,959

UNITED STATES PATENT OFFICE 2,108,959

VALVE

George R. Brown, Shaker Heights, Ohio, assignor to The North American Manufacturing Company, Cleveland, Ohio, a corporation of Ohio Application August 1, 1936, Serial No. 93,858

5 Claims. (Cl. 277—25)

This invention relates to valves of the type having the usual adjustment for control of flow between inlet and outlet, and also having provision for adjustment of the valve orifice. Such a valve is adapted for liquid fuel burner control where it may be employed in connection with a larger likewise adjustable valve in the air line for the burner. An example of such general arrangement is disclosed in Patent No. 1,846,946, issued February 23, 1932 to George F. Naab and myself jointly; and generally the object of the present invention is to improve the fuel valve there illustrated.

More particularly, objects of the invention are to improve the fineness of adjustment of the curtain employed to vary the valve orifices by eliminating lost motion from its adjusting mechanism, and to provide at the same time a novel seal against leakage at the location of such mechanism; also to make provision for slight variation in the valve operating characteristics.

Figure 1:
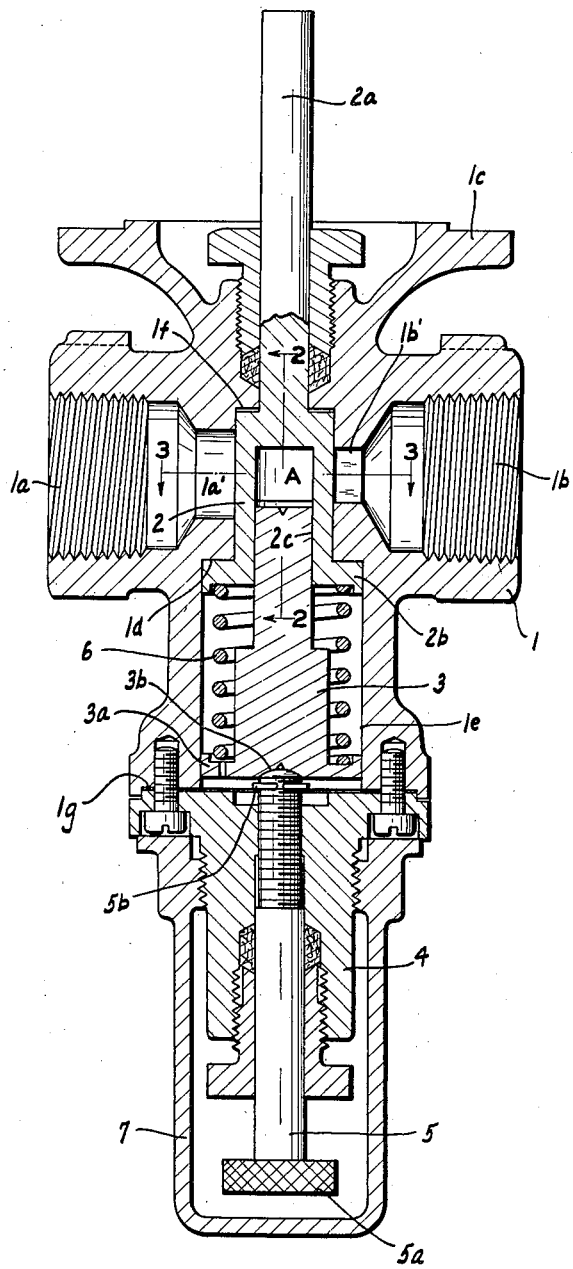
Figure 2:
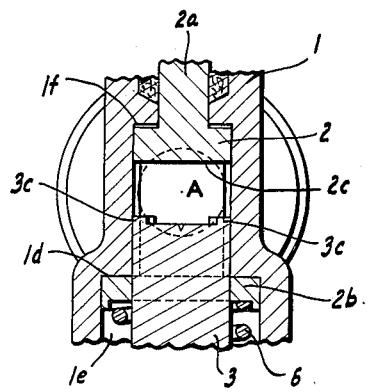
Figure 3:
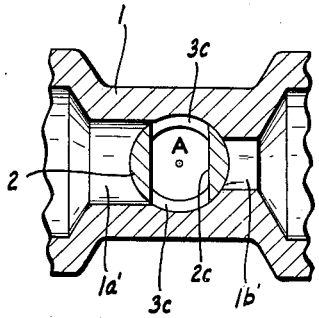

The exact nature of this invention together with further objects and advantages thereof will be apparent from the following description taken in connection with the accompanying drawing, in which Fig. 1 is a typical longitudinal section illustrating an embodiment of the invention, the valve being shown as in closed position; Fig. 2 is a longitudinal sectional detail as in the plane of line 2—2, Fig. 1; and Fig. 3 is a detail in transverse section as in the plane of line 3—3, Fig. 1.

With reference now to the drawing, 1 represents generally the principal member of the valve body having inlet and outlet openings 1a and 1b respectively and means such as the flange 1c whereby the body may be mounted.

Between its inlet and outlet openings the body 1 is provided with a cylindrical chamber in which the valve 2 is fitted for rotatable adjustment between open and closed positions as by a stem 2a passing through the stuffing box indicated. The body is provided with opposed ports leading to and from the valve chamber such as the inlet port 1a' which may be of circular section, and the outlet port 1b' which is of rectangular section. Opposite its stem 2a, the valve is provided with a circular head 2b seating upon the shoulder 1d at the end of a cylindrical bore 1e in the valve body, and preventing seating of the valve on the shoulder 1f adjacent the stuffing box about the valve stem. The valve has a laterally through slot 2c extending from the zone of the ports in the valve body, endwise through the head 2b. Fitting within the cavity provided by the slot 2c in the valve, is a curtain 3 having a perforate head 3a fitting within the bore 1e. The inner end of the curtain 3 thus cooperates with the slotted portion of the valve in the zone of the ports, to define the valve orifice A, the curtain rotates with the valve in the opening and closing adjustment of the latter, and the curtain is adjustable endwise of the valve to control its orifice. For the latter adjustment, according to this invention, a block 4 is mounted upon the valve body 1 as by the screws illustrated, as a closure for the bore 1e, and an adjusting screw 5 is threadedly mounted in the block concentric with the valve for adjustment along the valve axis by rotation upon the latter as by a knurled head 5a. A stuffing box is provided in the block about the screw to prevent leakage from the bore 1e. The gasket 1g provides a seal at the end of the bore, which is recessed as illustrated to accurately center the block.

To maintain the curtain 3 bearing against the adjustable stop means provided by the screw 5, so that adjustment of the curtain endwise of the valve will accurately follow rotational adjustment of the screw 5, without lost motion, a compression spring 6 is disposed within the bore 1e to bear between the head 2b of the valve and the head 3a of the curtain, these heads being provided with the peripheral flanges illustrated to maintain concentricity of the spring. It will be apparent that the head 2b of the valve is caused by the reaction of the spring to be seated against the shoulder 1d of the valve body and thus maintain a seal against leakage at this location. The end of the curtain is preferably slightly recessed as at 3b to fit the end of the screw 5 and thus improve its bearing thereagainst, and a cotter pin 5b or the like may be provided on the screw to limit its outward adjustment.

A cap 7 may be screw-threaded onto the block 4 for protection of the screw.

It will be apparent that by rotation of the stem 2a the valve is adjustable between open and closed positions whereas by adjustment of the screw 5 its effective orifice A in opened positions may be controlled.

For varying the opening and closing orifice characteristics, the end of the curtain 3 may be provided with projections 3c coextensive with the curtain across the valve slot, finished off in production as shown but which may be filed at the installation to such slope as will produce the desired result.

What I claim is:

1. A valve body having inlet and outlet ports, a valve rotatably mounted in said body to control flow between said ports and having a slot extending from an end into the zone of said ports, a curtain mounted in said slot for sliding adjustment endwise of the valve to control its orifice, said valve and curtain having opposed head parts, stop means mounted on said valve body adjustable endwise of said curtain adjacent its head part, and compression spring means arranged between said head parts to yieldably bear said curtain against said stop means.

2. A valve body having inlet and outlet ports, a valve rotatably mounted in said body to control flow between said ports and having a slot extending from an end into the zone of said ports, a curtain mounted in said slot for sliding adjustment endwise of the valve to control its orifice, said valve and curtain having opposed head parts, stop means mounted on said valve body adjustable endwise of said curtain adjacent its head part, and compression spring means arranged between said head parts to yieldably bear said curtain against said stop means, said valve body having a seat for said valve head part, arranged to take the reaction of said spring means.

3. A valve body having inlet and outlet ports, a valve rotatably mounted in said body to control flow between said ports and having a slot extending from an end into the zone of said ports, a curtain mounted in said slot for sliding adjustment endwise of the valve to control its orifice, said valve and curtain having opposed head parts, said valve body having a bore receiving said head parts, a block mounted on said valve body to close the mouth of said bore, screw stop means mounted in said block, and compression spring means arranged in said bore between said head parts to yieldably bear said curtain against said stop means.

4. A valve body having inlet and outlet ports, a valve rotatably mounted in said body to control flow between said ports, a curtain associated with said valve to turn therewith and for adjustment endwise thereof to control the valve orifice, said valve and curtain having longitudinally opposed parts, stop means mounted on said valve body to provide adjustment endwise of said curtain, and spring means arranged to be effective between said opposed parts to yieldably bear said curtain against said stop means, said stop means and spring means being disposed concentrically of said valve.

5. A valve body having inlet and outlet ports, a valve rotatably mounted in said body to control flow between said ports, a curtain associated with said valve to turn therewith and for adjustment endwise thereof to control the valve orifice, said curtain and said valve body extending longitudinally beyond said valve, in spaced relation to provide a recess about said extending curtain part, said curtain having a head part removed from said valve, stop means mounted on said valve body to provide adjustment endwise of said curtain, and spring means arranged in said recess to be effective between said curtain head part and said valve to yieldably bear said curtain against said stop means.

GEORGE R. BROWN.